April 14, 1959

W. GARTEN 2,882,330

BATTERY PLATE

Filed June 19, 1957

Inventor
Wilhelm Garten
By Michael S. Striker
agt.

United States Patent Office 2,882,330  
Patented Apr. 14, 1959

2,882,330

BATTERY PLATE

Wilhelm Garten, Hagen, Westphalia, Germany, assignor to Firma Accumulatoren-Fabrik Aktiengesellschaft Application June 19, 1957, Serial No. 666,533

4 Claims. (Cl. 136—43)

The present invention relates to battery plates.

More particularly, the present invention relates to battery plates composed of a series of juxtaposed porous tubular elements containing a mass of active material and of a series of conductor elements arranged within the respective tubular elements and embedded in the active mass contained therein.

Heretofore, the lower end portions of the tubes of such tubular plates have been provided with a connecting bar or strip of lead, which, after the plates were completed, were cast to a suitable form. This procedure, however, required temperatures of the order of 400° C. and this resulted in serious damage to the plates, particularly to tubes made of synthetic resin. Also, it was found that after but short periods a short circuit between the base conductive strips and the conductive lower edge of the negative plate would form.

In order to avoid this disadvantage, it was then proposed to slide a suitably formed strip of synthetic material over the lower ends of the tubes. This avoided the risk of short circuit, but experience has shown that strips which are superimposed or pushed onto the ends of the tubes may become loose during the manufacture of the plates and/or during the installation of the plates. It was also found that not infrequently the strip would fall off inasmuch as there was not firm connection between the tubes and the strip. This made it possible for the active mass to escape from the tubes, thereby causing short circuits.

It is therefore an object of the present invention to provide a battery plate construction which overcomes the above disadvantages.

It is another object of the present invention to provide a battery plate composed of a series of juxtaposed tubular elements wherein these elements are firmly connected to each other and wherein one end of each tubular element is well sealed.

The objects of the present invention also include the provision of a tubular battery plate which may easily be mass-produced at low cost.

It is yet another object of the present invention to provide a tubular battery plate which will give long periods of trouble-free service.

It is a still further object of the present invention to provide a method of connecting to each other and sealing the aligned end portions of a series of juxtaposed tubular end portions.

With the above objects in view, the present invention mainly resides that improvement in a battery plate which comprises a series of juxtaposed tubular elements having aligned portions, and a connecting sealing member of synthetic material cast about the aligned portions, thereby connecting and simultaneously sealing the latter.

More particularly, a battery plate according to the present invention comprises a series of juxtaposed tubular elements having aligned end portions, a series of conductor elements arranged within the tubular elements, respectively, each conductor element having an end portion located in the region of and preferably projecting exteriorly of the tubular element within which it is arranged, and a connecting sealing member of synthetic material cast about the aligned end portions of the tubular elements and the end portions of the conductor elements, thereby connecting the elements and simultaneously sealing the end portions of the tubular elements. In order to prevent the cast member from slipping off the elements, some of them, preferably the conductor elements, may be formed with transverse protuberances which the mass, when cast, surrounds, or with transverse indentations which the mass, when cast, fills.

The present invention further resides in that method of connecting to each other and sealing the aligned end portions of a series of juxtaposed tubular elements which comprises the step of casting a connecting sealing member of synthetic material about the aligned end portions.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
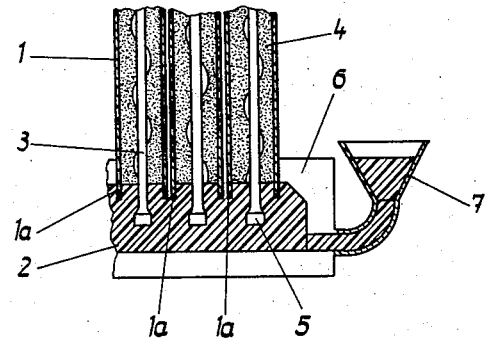
Fig. 1 is a fragmentary sectional view of a tubular plate and a mold within which the connecting sealing member is cast.
Figure 2:
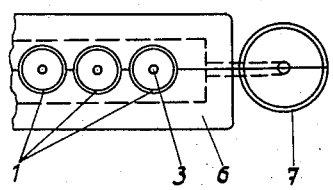
Fig. 2 is a plan view of the arrangement shown in Fig. 1.

Referring now to the drawings, and to Figs. 1 and 2 thereof in particular, there is shown a tubular plate composed of a series of juxtaposed porous tubular elements 1 having aligned end portions 1a. The tubes contain a mass of active material 4, which may be a positive mass, and a conductor element 3 made of lead is arranged within each of the tubes. Each conductor is embedded within the active mass of the respective tube and has an end portion which is in the region of the end portion 1a thereof. Preferably, the conductors project exteriorly of the respective tubes, as shown in Fig. 1, and are formed at their lower ends with a thicker portion or protuberance 5.

The end portions of the tubes and the conductors project into the interior of a steel form or mold 6, and a synthetic resin is then poured into the mold by way of a sprue 7. The resin is permitted to harden and, after the product is removed from the mold 6, the funnel-shaped portion of the cast material is cut off. The remainder of the cast material thus forms a member 2 which is cast about the aligned end portions of the tubes and the conductors, thereby firmly connecting these elements to each other and simultaneously sealing the end portions 1a of the tubes. Slipping off of the member 2 is prevented by the protuberances 5 on the end portions of the conductors 3 about which protuberances the member 2 is cast.

Figure 3:
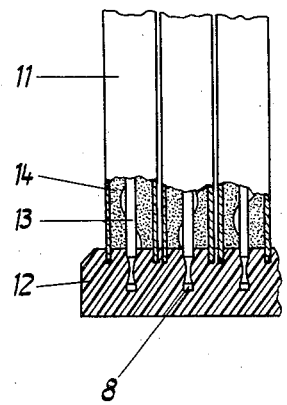
Fig. 3 is a fragmentary sectional view of a modified embodiment of a tubular plate with a cast-on connecting sealing member.

The tubular plate shown in Fig. 3 differs from the above-described embodiment only in that the conductors 13 which are embedded in the active mass 14 contained within the tubes 11 are formed with a transverse indentation 8 which may be in the form of annular grooves which are filled by the connecting sealing member 12 when the same is in liquid form during the casting operation.

According to the present invention the synthetic material of which the connecting sealing member is made is a synthetic resin which is capable of being cast at a relatively low temperature, such as a temperature of the order of 30–50° C. This is particularly desirable in cases where the porous tubular elements are also made of a synthetic material, so that damage to these tubular elements will be prevented during the casting of the connecting sealing member. The resin may consist of two components, namely the actual monomeric material and a so-called hardener, and accelerator and the following table is representative but not limitative of suitable resins:

| Resin | Monomeric Material and Percentage Thereof | Hardener and Percentage Thereof |
|---|---|---|
| Unsaturated polyester resins | Ester of unsaturated dicarboxylic acids with bivalent alcohols in a mixture with styrene or allyl ester 96%. | 2% benzoyl peroxide + 2% of a 1% cobaltic napthenate solution in monostyrene or 1% cyclohexanone peroxide + 2% of a 1% cobaltic napthenate solution in monostyrene. |
| Ethoxylene resins | Epichlorohydrin 60–80% + a phenylic compound of the type HO–⟨ ⟩–CR$_2$–⟨ ⟩–OH 15–35%. | Amines and polyamines 5%. |
| Thiokol | Organic polysulfide ether 87% | 6% dibutyl phthalate + 7% lead peroxide. |

It will be understood that each of the elements described above, or two or more together, may also find a useful application in other types of battery plates differing from the types described above.

While the invention has been illustrated and described as embodied in a tubular battery plate, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a battery plate, in combination, a series of juxtaposed tubular elements having aligned end portions; a series of conductor elements arranged within said tubular elements, respectively, each conductor element having an end portion located in the region of the end portion of the tubular element within which it is arranged spaced from the same, the end portions of at least some of said elements being formed with at least one transverse protuberance; and a connecting sealing member of synthetic material cast about said aligned end portions of said tubular members and said end portions of said conductor elements, including the respective protuberances thereof, thereby connecting said elements and simultaneously sealing said end portions of said tubular elements.

2. In a battery plate, in combination, a series of juxtaposed tubular elements having aligned end portions; a series of conductor elements arranged within said tubular elements, respectively, each conductor element having an end portion located in the region of the end portion of the tubular element within which it is arranged spaced from the same, the end portions of at least some of said elements being formed with at least one transverse indentation; and a connecting sealing member of synthetic material cast about said aligned end portions of said tubular members and said end portions of said conductor elements, and filling the respective indentations of the respective elements, thereby connecting said elements and simultaneously sealing said end portions of said tubular elements.

3. In a battery plate, in combination, a series of juxtaposed tubular elements having aligned end portions; a series of conductor elements arranged within said tubular elements, respectively, each conductor element having an end portion projecting exteriorly of the end portion of the tubular element within which it is arranged spaced from the same, the end portions of at least some of said conductor elements being formed with at least one transverse protuberance; and a connecting sealing member of synthetic material cast about said aligned end portions of said tubular members and said projecting end portions of said conductor elements, including the respective protuberances thereof, thereby connecting said elements and simultaneously sealing said end portions of said tubular elements.

4. In a battery plate, in combination, a series of juxtaposed tubular elements having aligned end portions; a series of conductor elements arranged within said tubular elements, respectively, each conductor element having an end portion projecting exteriorly of the end portions of the tubular element within which it is arranged spaced from the same, the end portions of at least some of said conductor elements being formed with at least one transverse identation; and a connecting sealing member of synthetic material cast about said aligned end portions of said tubular members and said projecting end portions of said conductor elements and filling the respective indentations of the respective conductor elements, thereby connecting said elements and simultaneously sealing said end portions of said tubular elements.

References Cited in the file of this patent

UNITED STATES PATENTS

| | | |
|---|---|---|
| 2,350,752 | Graf | June 6, 1944 |
| 2,373,281 | White | Apr. 10, 1945 |
| 2,420,456 | White | May 13, 1947 |